United States Patent
Boydell et al.

Patent Number: 6,087,427
Date of Patent: Jul. 11, 2000

[54] MOLDABLE THERMOPLASTIC RESIN COMPOSITION

[75] Inventors: Philip Leslie Boydell, Challex, France; Trevor John Hutley, Onex, Switzerland

[73] Assignee: E. I. du Pont de Nemours and Company, Wilmington, Del.

[21] Appl. No.: 08/747,059

[22] Filed: Nov. 12, 1996

Related U.S. Application Data

[60] Provisional application No. 60/007,403, Nov. 21, 1995.

[51] Int. Cl.⁷ ..................................................... C08K 5/04
[52] U.S. Cl. ........................................... 524/400; 524/399
[58] Field of Search ................................... 524/399, 400, 524/606; 264/300; 528/319, 336

[56] References Cited

U.S. PATENT DOCUMENTS

| | | | |
|---|---|---|---|
| 2,919,258 | 12/1959 | Pietrusza et al. | 524/399 |
| 3,080,345 | 3/1963 | Brooks et al. | 528/319 |
| 3,224,987 | 12/1965 | Kessler | 524/606 |
| 3,228,898 | 1/1966 | Illing et al. | 524/606 |
| 3,516,956 | 6/1970 | Reedy et al. | 524/399 |
| 3,755,221 | 8/1973 | Hitch | 524/227 |
| 3,801,521 | 4/1974 | Smith et al. | 524/227 |
| 4,290,935 | 9/1981 | Muraki | 524/227 |

*Primary Examiner*—Veronica P. Hoke
*Attorney, Agent, or Firm*—William H. Hamby

[57] ABSTRACT

The invention relates to a moldable thermoplastic resin composition comprising:

(a) 99.95–25% by weight of at least one polyamide-containing compound, (b) 0.05–5% by weight of at least one compound selected from the group consisting of magnesium-, zinc- and aluminium salts, and optionally (c) 0–70% by weight of at least one additive compound, which resin composition has an apparent melt viscosity according to ISO 11443 of less than 100 Pa.s, at a shear rate of 1000 s(−1) and at 0.1% by weight moisture content of the resin composition in the form of granules.

This invention furthermore relates to molded articles comprising such a thermoplastic resin composition.

9 Claims, No Drawings

MOLDABLE THERMOPLASTIC RESIN COMPOSITION

This application claims the benefit of U.S. Provisional Application No. 60/007,403, filed Nov. 21, 1995.

BACKGROUND OF THE INVENTION

1. Field of the Invention

The invention relates to a moldable thermoplastic resin composition.

2. Description of Prior Art

It is known in the art to add a wide variety of compounds to polyamides in order to improve or retain various properties thereof.

More specifically, it is known to manufacture fiber reinforced oriented polyamide films containing additives such as copper salts, alkali metal- or alkaline earth metal halides in order to impart a gloss to the surface of the manufactured product.

For moldable thermoplastic resin compositions it is particularly important to have a material available which has a relatively low viscosity because such a material can be processed easily with high injection speed and short cycle times in injection molding operations. However, compositions having such a low viscosity usually have inherent disadvantages for the properties of the molded articles, such as low molecular weight and low impact strength.

It would be of substantial technical and economical importance to have available for the molding industry a thermoplastic resin composition which can be injected at high speed in the molds in order to attain molded articles with excellent properties such as impact strength, surface gloss and tensile strength at relatively low cost.

The use of resin compositions which are known to be suitable for film manufacturing is not generally feasible for molding processes since a certain minimum viscosity is required to manufacture films in a stable operation whereas for injection molding the viscosity should not be higher than a certain value, as discussed hereinbefore.

Surprisingly, it has now been found that moldable thermoplastic resins with an excellent balance of chemical and physical properties can be obtained by combining a polyamide-containing compound with a relatively small amount of a specific selection of metal salts.

SUMMARY OF THE INVENTION

The present invention relates to a moldable thermoplastic resin composition comprising:

(a) 99.95–25% by weight of at least one polyamide-containing compound, (b) 0.05–5% by weight of at least one compound selected from the group consisting of magnesium-, zinc- and aluminium salts, and optionally (c) 0–70% by weight of at least one additive compound, which resin composition has an apparent melt viscosity according to ISO 11443 of less than 100 Pa.s, at a shear rate of 1000 s(−1) at 0.1% by weight moisture content of the resin composition in the form of granules.

DETAILED DESCRIPTION

The addition of metal compounds to thermoplastic resins has been known for a long time, either for the purpose of catalysis or in order to render the resin electrically conductive or improve the flame retardancy or other properties, such as surface gloss.

However, until now it was not thought to be feasible to substantially decrease the apparent viscosity of a polyamide-containing composition without a substantial negative impact on the properties of the molded end-product by adding a relatively small amount of a specific metal salt.

Surprisingly, it has now been found that salts of magnesium, zinc and aluminium can substantially decrease the apparent melt viscosity of a melted polyamide-containing composition at conditions at which such a composition is used industrially in large injection molding equipment.

The apparent melt viscosity is measured according to ISO 11443 at a processing temperature of the polyamide-containing compound of 30° C. above the melting point of the major fraction of such compound; for polyamide 6/6 this temperature is 295° C.

Preferably the metal salts should be soluble in the polyamide(s) which are to be used for molding, at least to the extent that an amount of 0.05–5% by weight of the metal salt is dissolved or very well dispersed in the polyamide, in order to attain the maximum viscosity-lowering effect and uniform properties of the molded article.

Preferred salts are organic salts of magnesium, zinc or calcium, in particular salts of carboxylic acids of magnesium; in case polyamide 6/6 is a major compound of the composition according to the invention, magnesium acetate is a particularly preferred metal compound to be added thereto.

Metal halides can also be used in the present compositions but are not preferred in view of their potentially corrosive effect on the metal equipment used on a commercial scale.

Therefore substantially halide-free salts are preferred in the present compositions.

In one preferred embodiment of the present invention, the polyamide-containing compounds comprise non-aromatic polyamides which are relatively economical to produce and have excellent physical and chemical properties when combined with the metal salts according to the invention as shown hereinafter in the Examples. In particular, non-aromatic polyamides selected from the group consisting of the polyamides 4/6, 6, 6/6, 6/10, 6/12, 11 and 12 are preferred compounds; resin compositions comprising the polyamides 6 and 6/6, especially when the weight ratio of polyamide 6/6 to 6 is from 1–40, are showing excellent behavior with respect to their apparent viscosity (low) and impact strength (high) of the molded end-product, which is an unexpected combination of effects for such polyamide compositions. It would normally be expected that a decrease in apparent viscosity (by adding an appropriate flow improving additive compound) would lead to a decrease in impact strength of the molded end product.

In another preferred embodiment of the present invention, the polyamide-containing compounds comprise at least one aromatic polyamide containing a metaxylylene diamide group, a terephthalic acid group or an isophthalic acid group.

Various types of additives may be present in resin compositions according to the invention. One of the most significant additives in terms of weight percentage is a mineral reinforcing compound which may generally be present in an amount of 20–60% by weight, based on the total weight of the resin composition. Different types of reinforcing compounds can be used in the present resin compositions, e.g., minerals (such as talc, wolastonite or kaolin) and fibers. A wide variety of fibers can be used, both with respect to their dimensions and their chemical composition. Suitable dimensions for the fibers depend strongly on the type of application of the resin. However, in many applications fibers with an average aspect ratio (ratio of length to diameter) in the molding resin of between 5 and 100 and a diameter of between 1 and 20 microns are suitable. Various types of fibers can be used, including both natural and man-made fibers, such as carbon-, mineral-, polymer- and glass fibers. Suitable polymer fibers are polyaramid fibers.

The fibers may be coated with, e.g., a silane compound in order to improve their adhesion to the resin composition.

The additive compounds which are optionally present in the composition according to the invention may further comprise one or more compounds selected from a wide variety of compounds tailored for different applications of the resin compositions.

In one preferred embodiment of the present invention the resin composition comprises (c) 0.02–10% by weight of at least one additive compound in particular of the group consisting of pigments, lubricants, plasticizers, UV- and other stabilizers, flow aids, antioxidants, mold release agents, nucleating agents, impact modifiers and flame retardants.

The present invention further relates to molded articles comprising a thermoplastic resin composition as defined hereinbefore. Such articles may have applications including, but not limited to automotive components, electrical- and electronic components, aerospace components, applications in sports- and leisure articles, in household- and technical appliances and in the building industry.

Some examples of electrical components which may advantageously comprise molded articles according to the invention are (cable) connectors, cable ties, fuse boxes and powertool housings.

For the automotive industry applications of molded articles according to the invention can be wheel covers, spoilers, air-dams, rocker covers, air filters, fuel filters, fan shrouds and adsorbent (e.g. carbon canisters).

The invention is illustrated by the following Examples.

EXAMPLE 1

Thermoplastic resin composition A (according to the invention) comprises 99.7% by weight of polyamide 6/6 and 0.3% by weight of magnesium acetate. The resulting resin composition has a relative viscosity in formic acid according to ASTM D 789 of 46 and has an apparent melt viscosity according to ISO 11443 of 24 Pa.s at 295° C., at a shear rate of 1000 s(−1) and at 0.1% by weight of moisture content of the resin composition in the form of granules. Such a relatively low viscosity results in excellent (relatively low) pressure drop between the gate and the end of the flow path of a molding cavity.

EXAMPLE 2

A similar polyamide 6/6 as present in resin composition A was combined with polyamide 6 and magnesium acetate resulting in a resin composition B (according to the invention) containing 94.7% by weight of polyamide 6/6, 5.0% by weight of polyamide 6 and 0.3% by weight of magnesium acetate. The apparent melt viscosity of the resulting resin composition B was 25 Pa.s, and the relative viscosity was 45 measured at the same conditions as resin A. This shows that the presence of a magnesium salt also has a significant effect on the apparent melt viscosity of resin compositions comprising different polyamide compounds.

EXAMPLE 3

Resin compositions A and B were used to manufacture 2 mm thick test strips of molded resin by means of injection molding. The impact strength was measured at 23° C. after maintaining the test strips in a moisture-proof bag for 24 hours.

Surprisingly, it has been found that when a relatively small amount of another polyamide is included in the resin composition, the impact strength of the resulting resin composition is increased, while maintaining the relatively low apparent melt viscosity obtained by including magnesium acetate. This is a very desirable and unexpected combination of properties for injection moldable resins.

The results of Examples 1–3 are combined in the Table hereinafter.

The compositions are given in weight percentages.

The apparent melt viscosity is defined as described in this Example 3.

The impact strength is measured in KJ/m$^2$ under conditions as described in this Example 3.

TABLE

| Resin | A | B |
|---|---|---|
| Compounds: | | |
| Polyamide 6/6 | 99.7 | 94.7 |
| Polyamide 6 | | 5.0 |
| Mg Acetate | 0.3 | 0.3 |
| Al Distearate | | |
| Apparent melt viscosity according to ISO 11443 | 24 | 25 |
| Relative viscosity according to ASTM D-789 | 46 | 45 |
| Impact Strength | 7.1 | 7.7 |
| Acc. to invention | Yes | Yes |

We claim:

1. Moldable thermoplastic resin composition comprising:
   (a) 99.95–25% by weight of at least one polyamide-containing compound, said resin excluding modified polyolefins,
   (b) 0.05–5% by weight of at least one compound selected from the group consisting of acetate salts of magnesium, zinc and aluminum,
   which resin composition has an apparent melt viscosity according to ISO 11443 of less than 100 Pa.s, at a shear rate of 1000 s(−1) and at 0.1% by weight moisture content of the resin composition in the form of granules.

2. Composition according to claim 1 in which the polyamide-containing compounds comprise non-aromatic polyamides.

3. Composition according to claim 2 in which the non-aromatic polyamides are selected from the group consisting of the polyamides 4/6, 6, 6/6, 6/10, 6/12, 11 and 12.

4. Composition according to claim 3 which comprises polyamides 6 and 6/6.

5. Composition according to claim 1 in which the polyamide-containing compounds comprise at least one aromatic polyamide containing a metaxylylene diamide group, a terephthalic acid group or an isophthalic acid group.

6. Composition according to claim 1 wherein the compound selected from the group consisting of magnesium, zinc and aluminum salts is magnesium acetate or zinc acetate.

7. Composition according to claim 1 wherein (c) comprises 20–60% by weight of at least one reinforcing compound.

8. Composition according to claim 1 wherein (c) comprises 0.02–10% by weight of at least one additive compound of the group consisting of pigments, lubricants, plasticizers, stabilizers, flow aids, anti-oxidants, mold release agents, nucleating agents, impact modifiers and flame retardants.

9. Molded article comprising a thermoplastic resin composition according to and one of the preceding claims.

* * * * *